US011597096B2

(12) United States Patent
Eun et al.

(10) Patent No.: US 11,597,096 B2
(45) Date of Patent: Mar. 7, 2023

(54) MODULAR MOBILE ROBOT COMPRISING PORTER MODULE

(71) Applicant: LG ELECTRONICS INC., Seoul (KR)

(72) Inventors: Yousook Eun, Seoul (KR); Jinsu Kim, Seoul (KR); Taewoo Yoo, Seoul (KR); Soonho Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 347 days.

(21) Appl. No.: 16/754,299

(22) PCT Filed: May 20, 2019

(86) PCT No.: PCT/KR2019/005987
§ 371 (c)(1),
(2) Date: Apr. 7, 2020

(87) PCT Pub. No.: WO2019/240390
PCT Pub. Date: Dec. 19, 2019

(65) Prior Publication Data
US 2020/0306984 A1    Oct. 1, 2020

(30) Foreign Application Priority Data

Jun. 14, 2018 (KR) .......................... 10-2018-0068253

(51) Int. Cl.
*B60P 7/00* (2006.01)
*B25J 11/00* (2006.01)
(Continued)

(52) U.S. Cl.
CPC ............. *B25J 11/008* (2013.01); *B25J 5/007* (2013.01); *B25J 9/08* (2013.01); *B25J 9/126* (2013.01);
(Continued)

(58) Field of Classification Search
CPC ............ B60P 7/00; B62J 9/162; Y10S 901/01
(Continued)

(56) References Cited

U.S. PATENT DOCUMENTS 10,286,558 B1 * 5/2019 Asada .................... B25J 13/003
2013/0226344 A1    8/2013 Wong et al.
(Continued)

FOREIGN PATENT DOCUMENTS

CN    216144429 U  *  3/2022
JP    2015-518188 A    6/2015
(Continued)

OTHER PUBLICATIONS

Machine translation of WO 163 (Year: 2020).*
International Search Report (PCT/ISA/210) issued in PCT/KR2019/005987, dated Aug. 12, 2019.

*Primary Examiner* — Hilary L Gutman
(74) *Attorney, Agent, or Firm* — Birch, Stewart, Kolasch & Birch, LLP

(57) ABSTRACT

A modular movable robot including a main body, a traveling unit mounted on a lower end of the main body, a module coupling plate which is mounted on an upper end of the main body and on which an object to be transferred is disposed on a top surface thereof, a port module coupled to the top surface of the module coupling plate to fix the object to be transferred, the port module being configured to provide module information to the module coupling plate, a body display unit extending from one end of the module coupling plate, a head display unit rotatably mounted on an upper end of the body display unit, and a control unit configured to receive the module information from the module coupling plate to control at least one of the body display unit or the head display unit on the basis of the received information.

18 Claims, 13 Drawing Sheets

(51) Int. Cl.
  *B25J 5/00*     (2006.01)
  *B25J 9/08*     (2006.01)
  *B25J 9/12*     (2006.01)
  *B25J 9/16*     (2006.01)
  *B25J 13/08*    (2006.01)
  *B25J 19/02*    (2006.01)
(52) U.S. Cl.
  CPC ........... *B25J 9/1666* (2013.01); *B25J 9/1676*
        (2013.01); *B25J 13/085* (2013.01); ***B25J
        19/021* (2013.01); *B60P 7/00*** (2013.01)
(58) Field of Classification Search
  USPC ................................................... 318/568.12
  See application file for complete search history.

(56) References Cited

U.S. PATENT DOCUMENTS

| | | |
|---|---|---|
| 2015/0012163 A1 | 1/2015 | Crawley |
| 2017/0129099 A1 | 5/2017 | Alduaiji et al. |
| 2017/0312916 A1 | 11/2017 | Williams et al. |
| 2021/0323581 A1* | 10/2021 | Ju .................. B60W 60/00256 |
| 2022/0126443 A1* | 4/2022 | Kim .................... B25J 9/1697 |

FOREIGN PATENT DOCUMENTS

| | | | | |
|---|---|---|---|---|
| KR | 10-2011-0004015 A | | 1/2011 | |
| KR | 10-2011-0022130 A | | 3/2011 | |
| KR | 20140077655 A | * | 6/2014 | |
| WO | WO-2020256163 A1 | * | 12/2020 | ............ B25J 11/008 |

* cited by examiner

[Fig. 1]
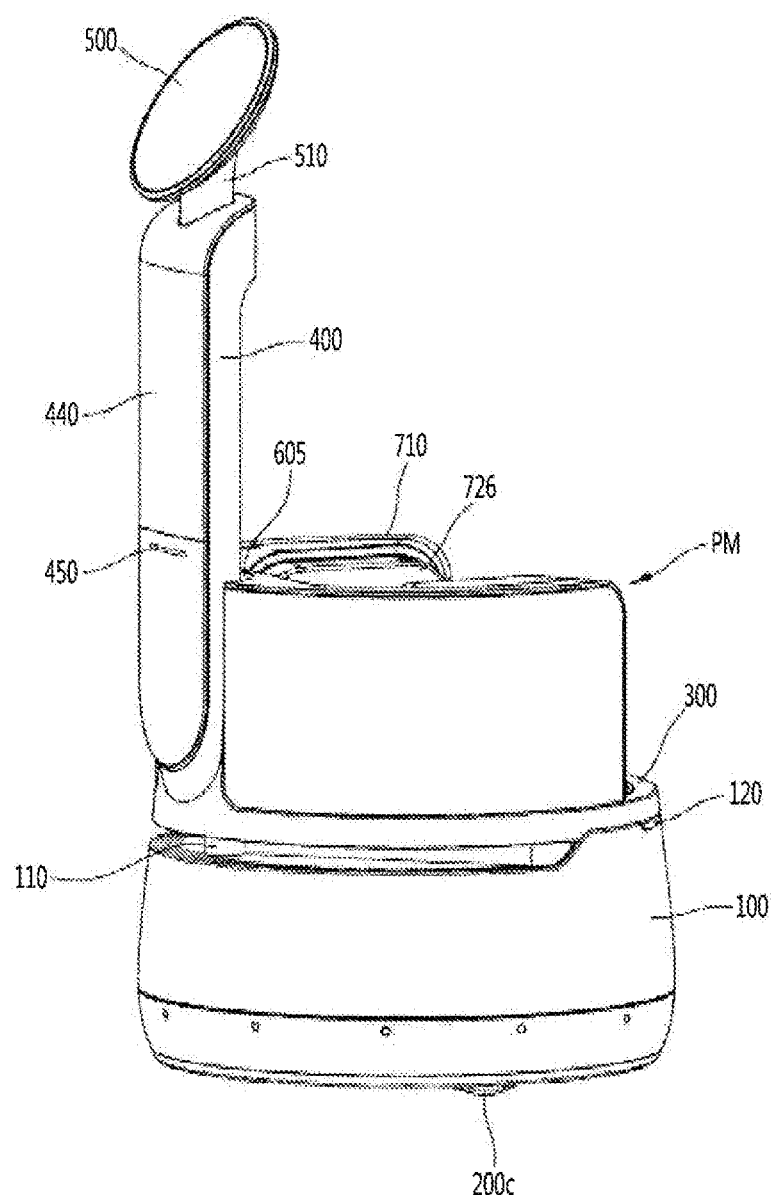

[Fig. 2]
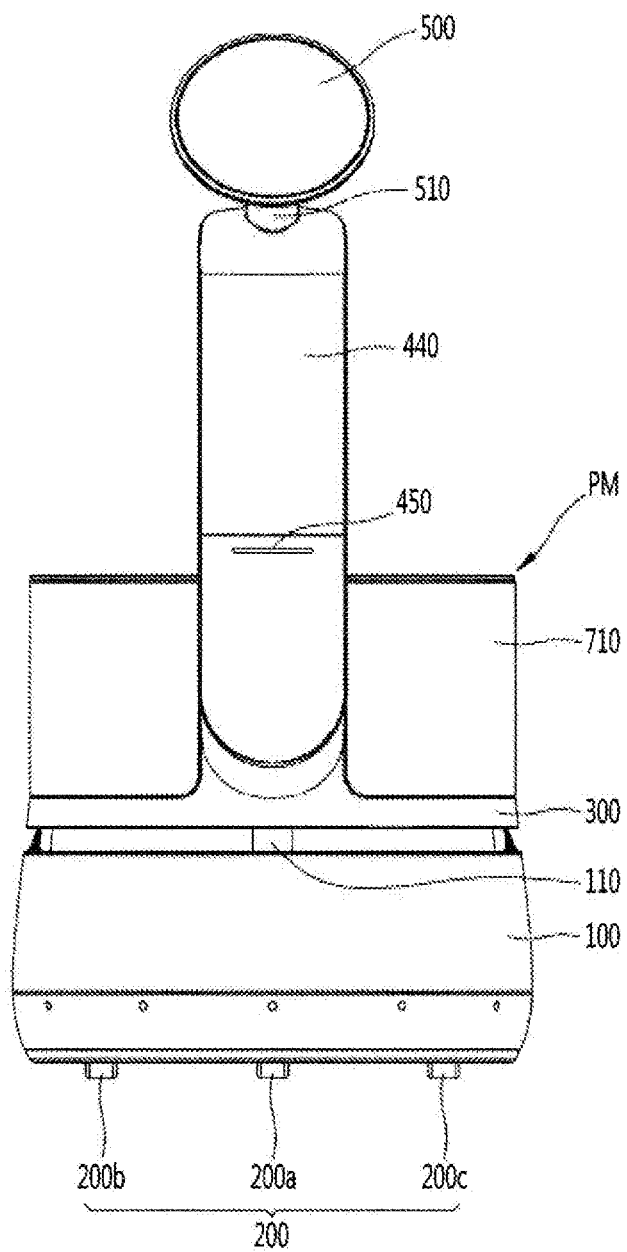

[Fig. 3]
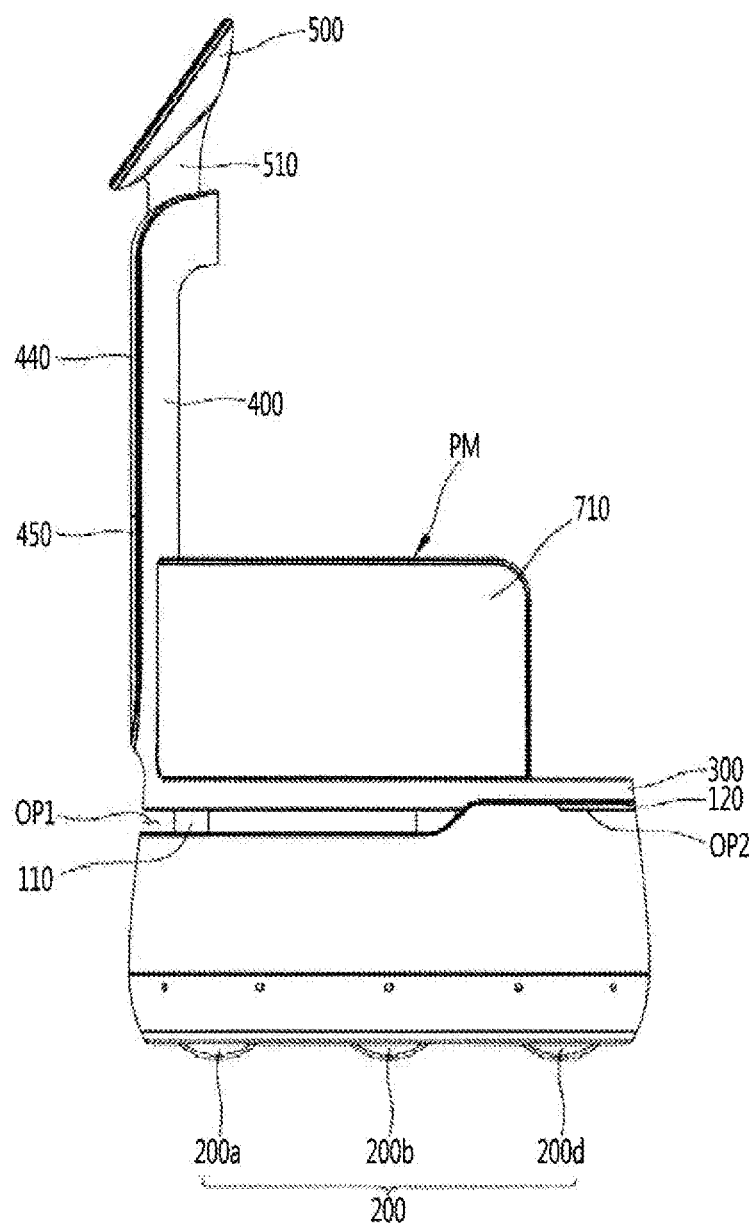

[Fig. 4]
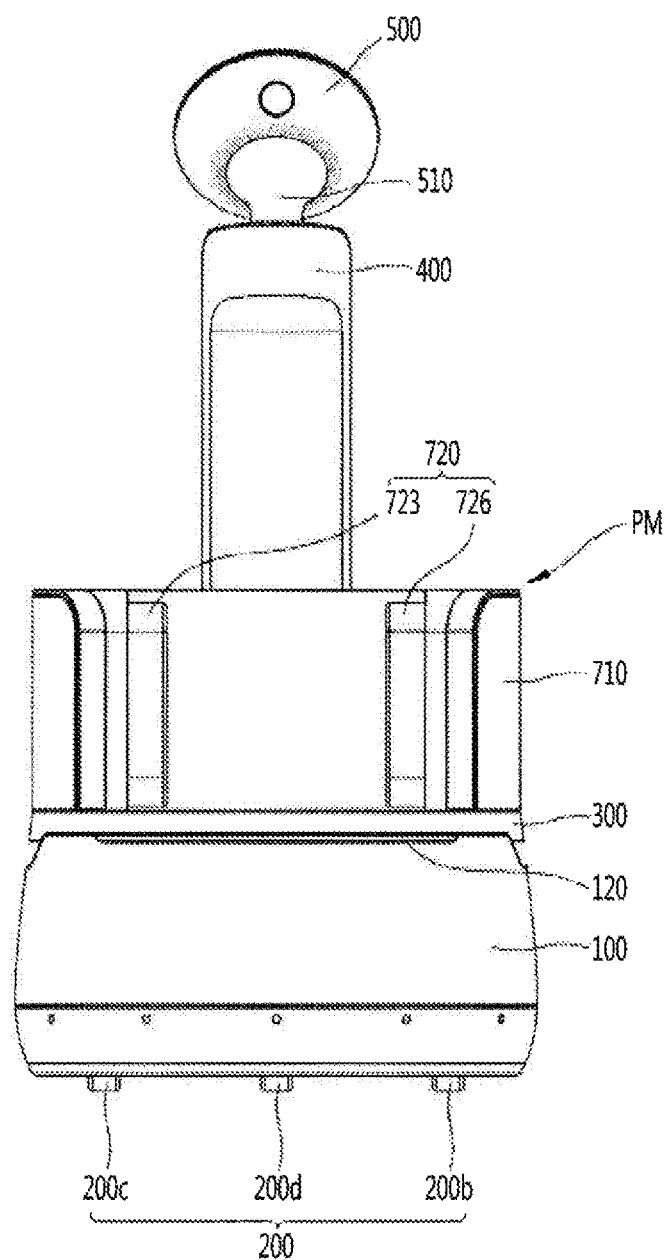

[Fig. 5]
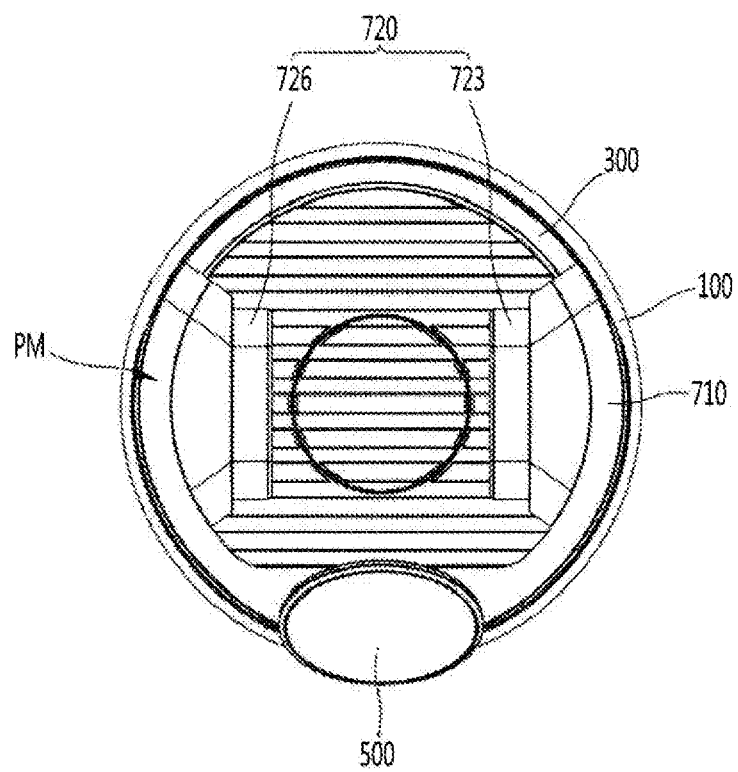

【Fig. 6】
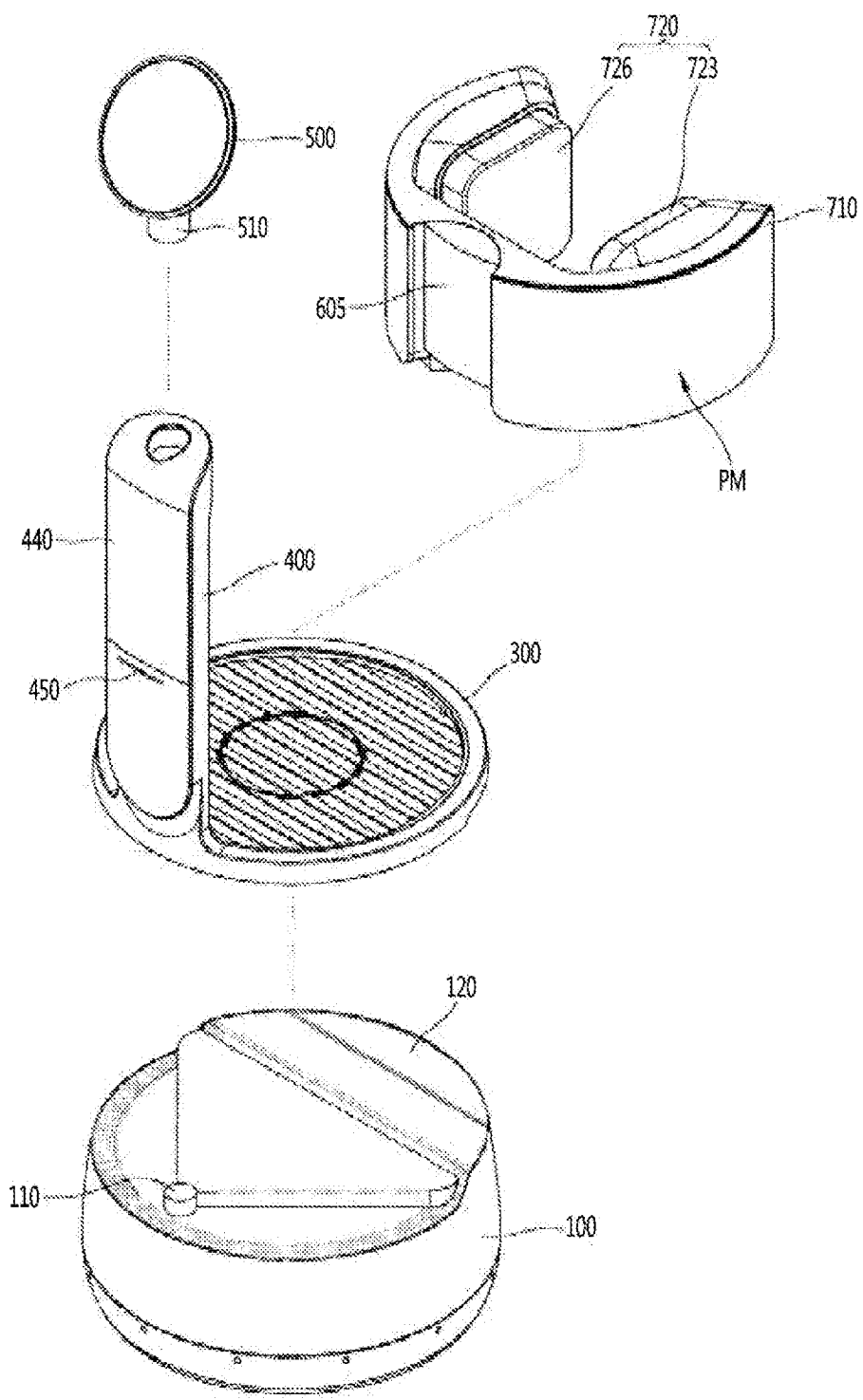

[Fig. 7]
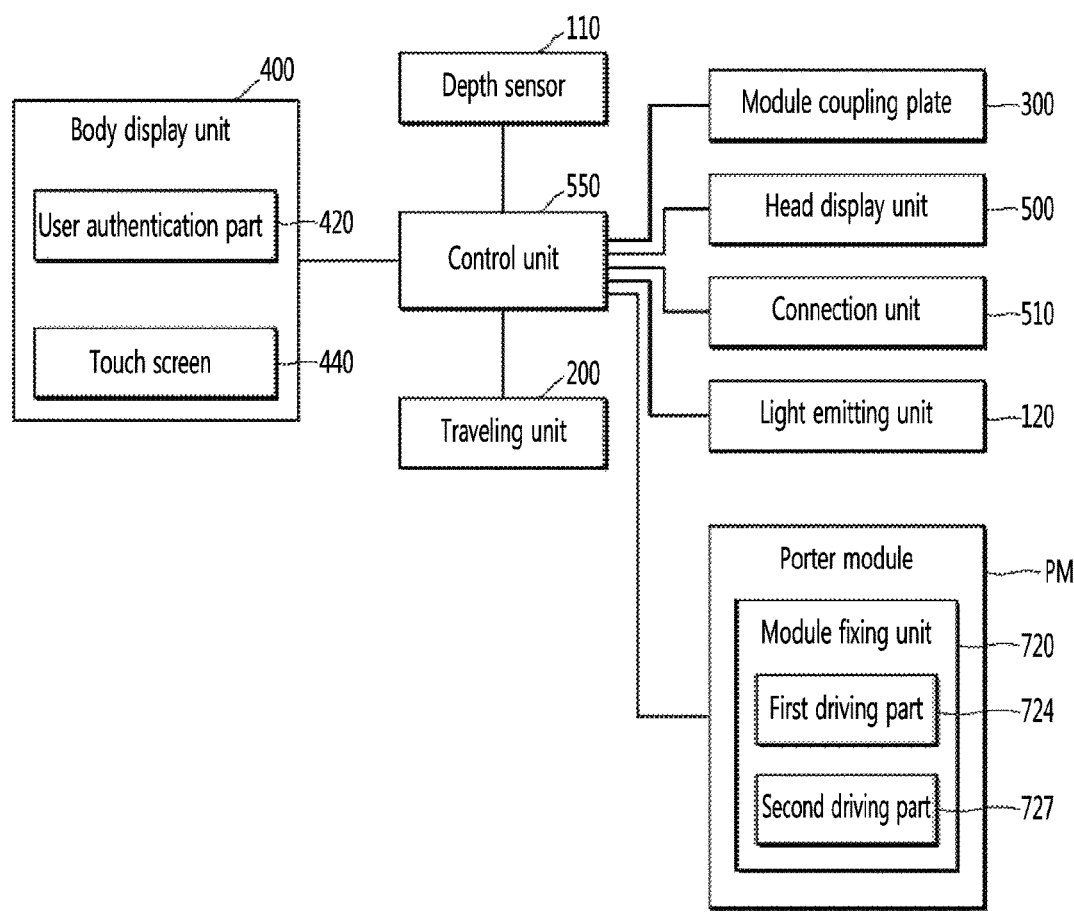

【Fig. 8】
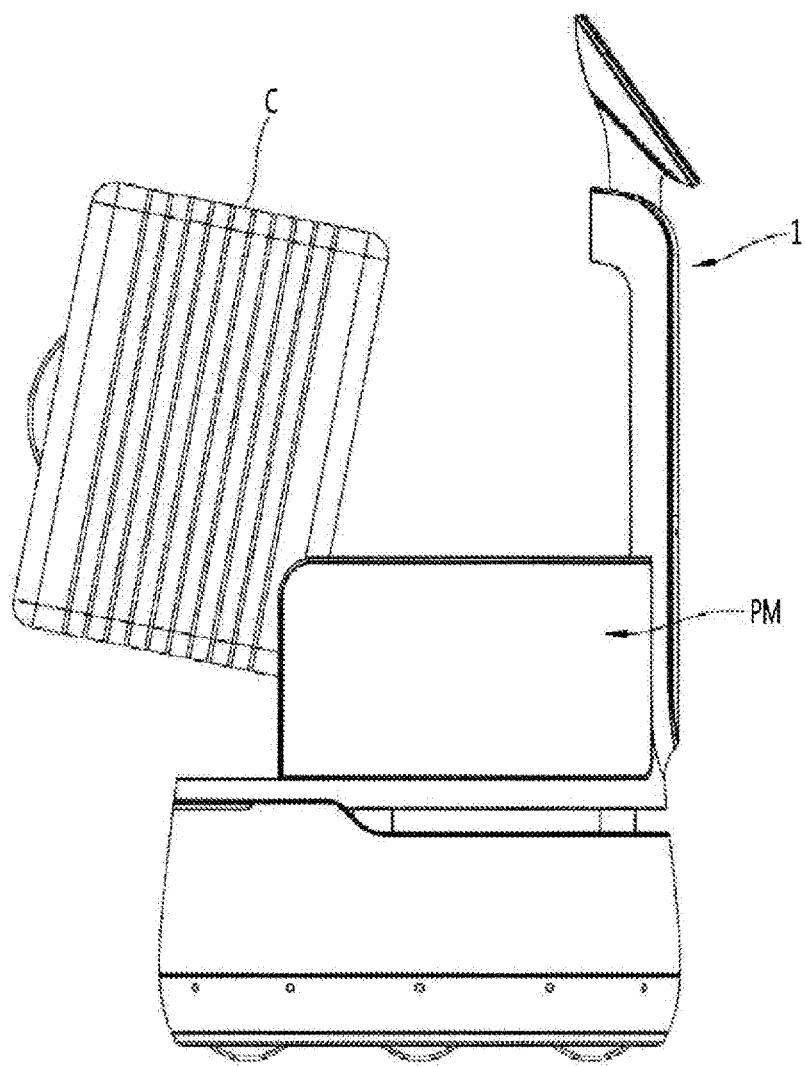

[Fig. 9]
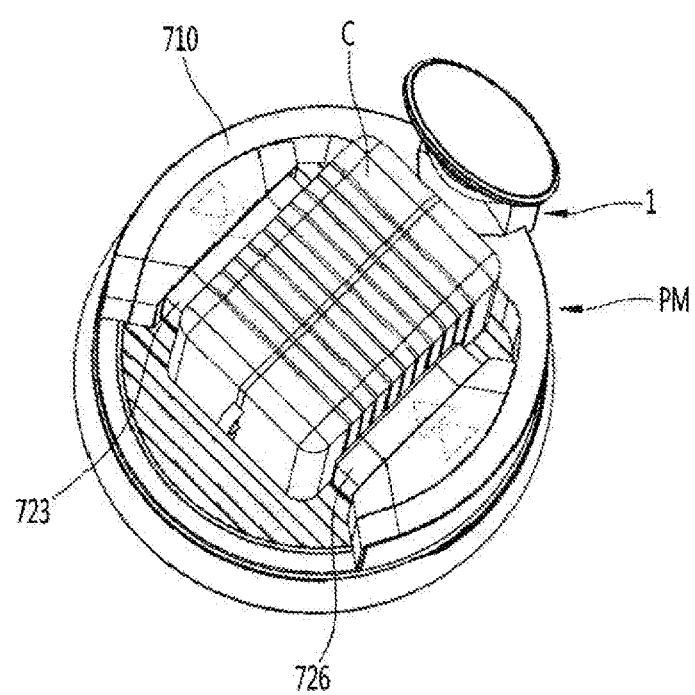

【Fig. 10】
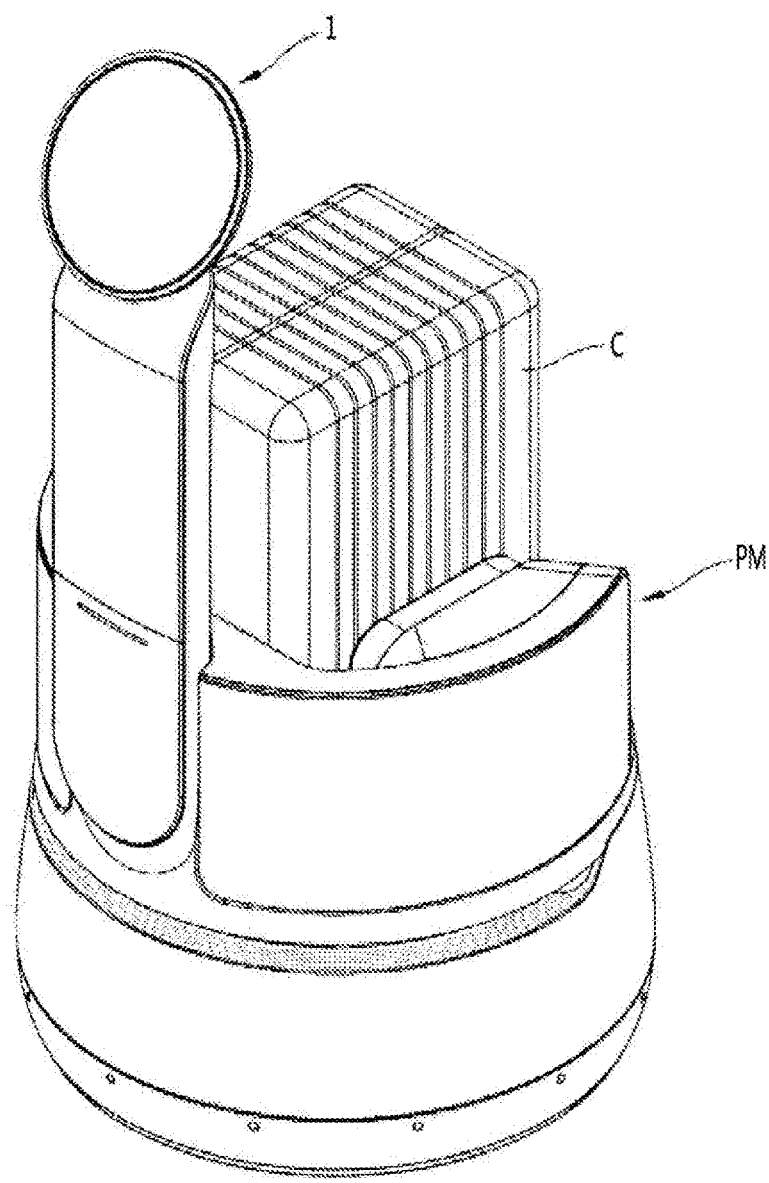

[Fig. 11]
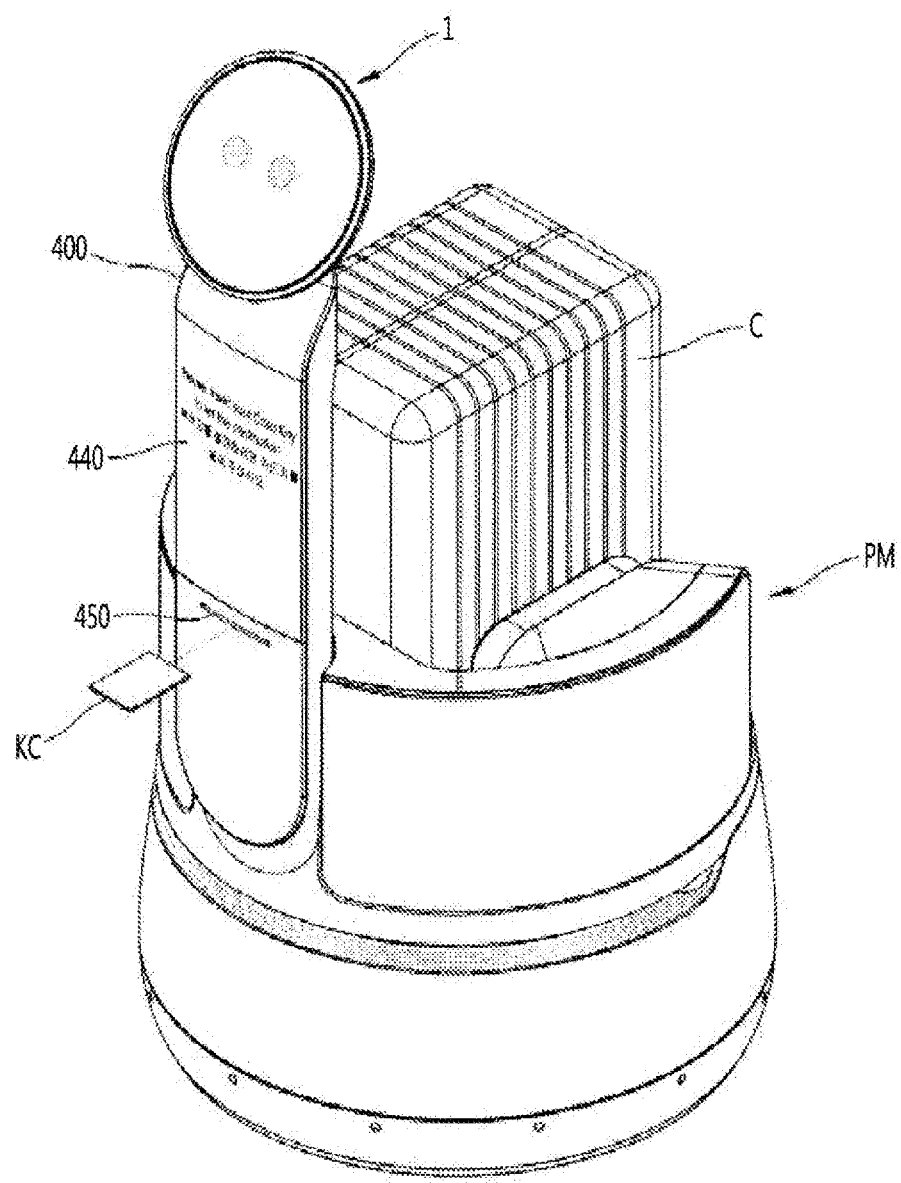

[Fig. 12]
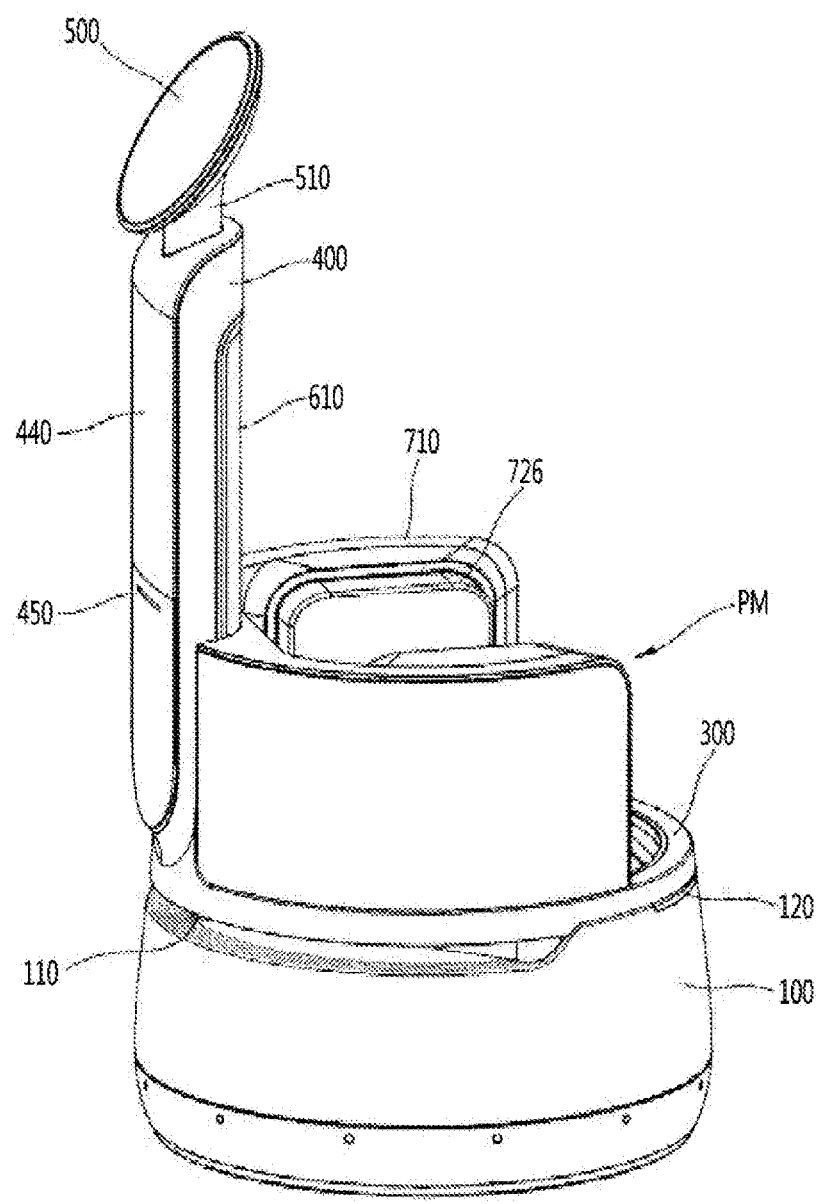

【Fig. 13】
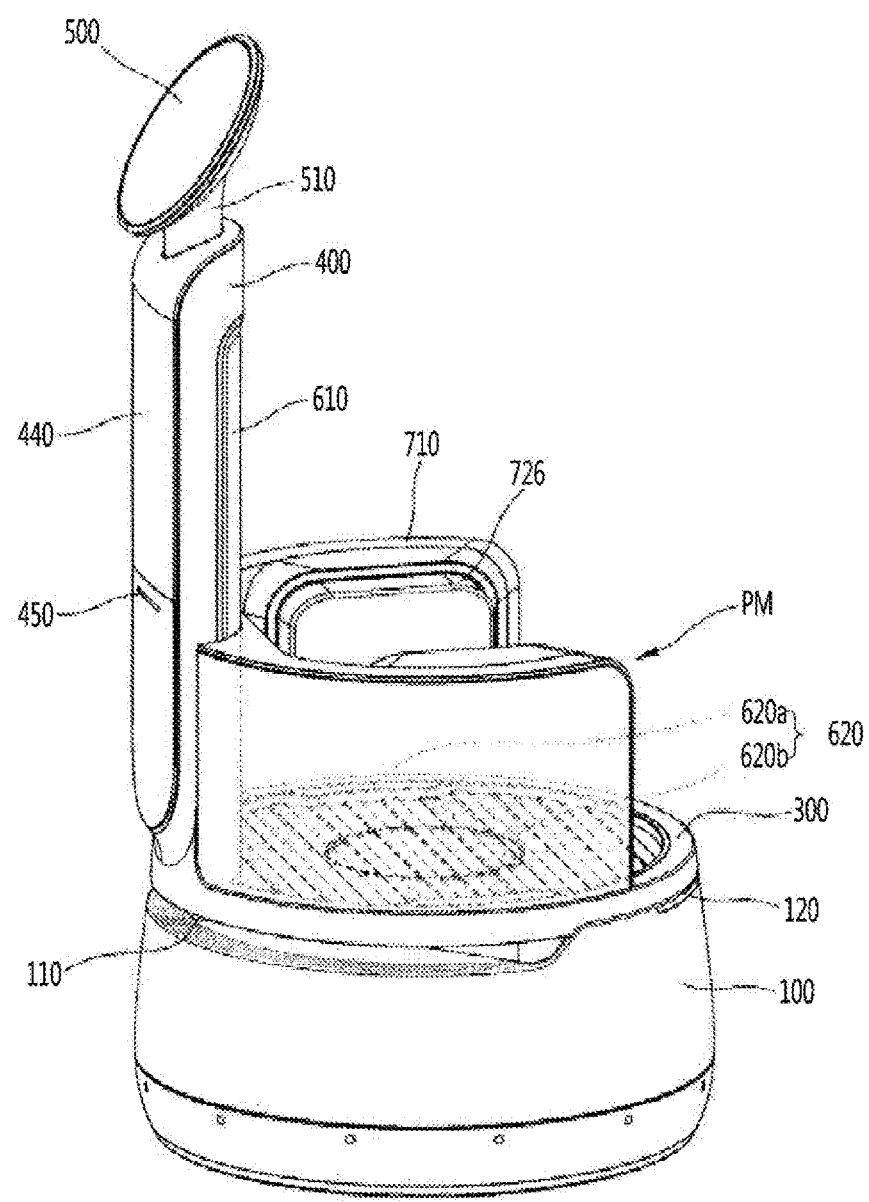

MODULAR MOBILE ROBOT COMPRISING PORTER MODULE

CROSS REFERENCE TO RELATED APPLICATIONS

This application is the National Phase of PCT International Application No. PCT/KR2019/005987, filed on May 20, 2019, which claims priority under 35 U.S.C. 119(a) to Patent Application No. 10-2018-0068253, filed in the Republic of Korea on Jun. 14, 2018, all of which are hereby expressly incorporated by reference into the present application.

TECHNICAL FIELD

The present invention relates to a modular movable robot including a porter module.

BACKGROUND ART

Robots have been developed for industrial use in order to be part of factory automation. In recent years, fields of application of the robots have been expanded, and thus, robots that are used in everyday life as well as medical robots and aerospace robots are being developed.

Such a robot for the daily life provides specific services (e.g., shopping, transporting, serving, talking, cleaning, etc.) in response to a user's command.

However, since the existing robots for the daily life are designed to provide only a specific service, there is a limitation that cost-effective utilization of the robots is not high.

As a result, in recent years, there is a need for robots capable of providing various services.

DISCLOSURE OF THE INVENTION

Technical Problem

An object of the present disclosure is to provide a modular movable robot that is capable of providing various services in addition to the transportation service.

Also, another object of the present disclosure is to provide a modular movable robot to realize automatic driving.

The objects of the present disclosure are not limited to the aforesaid, but other objects not described herein will be clearly understood by those skilled in the art from descriptions below. Also, the objects and advantages of the present disclosure the means as claimed and combinations thereof can be easily realized by it will be seen.

Technical Solution

A modular movable robot according to the present disclosure includes a module coupling plate on which an object (for example, a carrier) to be transferred is disposed on a top surface thereof, a port module coupled to the module coupling plate to fix the object to be transferred, a control unit configured to control at least one of a body display unit or a head display unit on the basis of information with respect to the porter module, which is received from the module coupling plate.

Also, a modular movable robot according to the present disclosure includes a depth sensor mounted between a module coupling plate and a main body to detect an obstacle disposed outside the main body, a driving sensor mounted on a lower end of the main body so that the main body is movable, and a control unit controlling driving of the traveling unit on the basis of information with respect to an detected obstacle, which is received from the depth sensor to realize automatic driving.

Advantageous Effects

The modular movable robot according to the present disclosure may provide the various services such as the transport, the road guidance, the identify verification and improve the utilization of the existing daily life robot (particularly, robots that provide only the transport service).

In addition, the modular movable robot according to the present disclosure may be automatically driven to expand the application fields and improve the service quality. Also, it may be unnecessary to directly move the robot so as to provide the service at a specific position or place, thereby improving usability.

The specific effects of the present disclosure in addition to the above-described effects will be described below together while describing specific details for carrying out the invention.

BRIEF DESCRIPTION OF THE DRAWINGS

FIG. 1 is a perspective view for explaining a modular movable robot according to an embodiment of the present disclosure.

FIG. 2 is a front view of the modular movable robot of FIG. 1.

FIG. 3 is a side view of the modular movable robot of FIG. 1.

FIG. 4 is a rear view of the modular movable robot of FIG. 1.

FIG. 5 is a plan view of the modular movable robot of FIG. 1.

FIG. 6 is an exploded perspective view of the modular movable robot of FIG. 1.

FIG. 7 is a schematic view for explaining a control flow of the modular movable robot of FIG. 1.

FIGS. 8 to 10 are schematic views illustrating a process of loading an object to be transferred on a porter module of FIG. 1.

FIG. 11 is a schematic view for explaining services provided by the modular movable robot of FIG. 1.

FIG. 12 is a perspective view for explaining a modular movable robot according to another embodiment of the present disclosure.

FIG. 13 is a schematic view for explaining some components of the modular movable robot of FIG. 12.

MODE FOR CARRYING OUT THE INVENTION

Preferred embodiments of the present disclosure will be described below in more detail with reference to the accompanying drawings. In the drawings, the same reference numerals are used to denote the same or similar elements.

Hereinafter, a modular movable robot according to an embodiment will be described with reference to FIGS. 1 to 7.

FIG. 1 is a perspective view for explaining a modular movable robot according to an embodiment of the present disclosure. FIG. 2 is a front view of the modular movable robot of FIG. 1. FIG. 3 is a side view of the modular movable robot of FIG. 1. FIG. 4 is a rear view of the modular movable robot of FIG. 1. FIG. 5 is a plan view of the modular movable robot of FIG. 1. FIG. 6 is an exploded perspective view of the modular movable robot of FIG. 1. FIG. 7 is a schematic view for explaining a control flow of the modular movable robot of FIG. 1.

Referring to FIGS. 1 to 7, a modular movable robot 1 according to an embodiment of the present disclosure may include a main body 100, a depth sensor 110, a light emitting unit 120, a traveling unit 200, a module coupling plate 300, a body display unit 400, a head display unit 510, a connection unit 510, a porter module PM, and a control unit 550.

The main body 100 may constitute a body of the modular movable robot 1.

In detail, the main body 100 may have, for example, a circular or oval cross-section. Also, the traveling unit 200 may be mounted on a lower end of the main body 100, and the module coupling plate 300 may be mounted on an upper end of the main body 100.

Also, the control unit 550 may be provided in the main body 100. Alternatively, the control unit 550 may not be provided in the main body 100 but be provided in the body display unit 400 or the module coupling plate 300. However, for convenience of description, according to an embodiment, the structure in which the control unit 550 is provided (built) in the main body 100 will be described as an example.

Also, the depth sensor 110 and the light emitting unit 120 may be mounted on a top surface of the main body 100.

In detail, the depth sensor 110 and the light emitting unit 120 may be mounted between the main body 100 and the module coupling plate 300. Also, the depth sensor 110 may be mounted on a front area of an area between the main body 100 and the module coupling plate 300, and the light emitting unit 120 may be mounted on a rear area of the area between the main body 100 and the module coupling plate 300.

Here, the depth sensor 110 may be, for example, an RGB-D sensor. Also, the depth sensor 110 may grasp a shape of an object to distinguish a bottom area and an object area from each other. Thus, the depth sensor 110 may detect an obstacle disposed outside the main body 100. Furthermore, the depth sensor 110 may provide information with respect to the detected obstacle to the control unit 550.

Also, the light emitting unit may be, for example, a light emitting diode (LED). Also, the light emitting unit may be controlled by the control unit 550 and serve as a rear alarm lamp of the modular movable robot 1.

That is, the control unit 550 may receive the information with respect to the obstacle detected by the depth sensor 110 to control at least one of the traveling unit 200 or the light emitting unit 120 on the basis of the received information.

For example, when information in which an obstacle exists at the front of the modular movable robot 1 is received from the depth sensor 110, the control unit 550 may control each of the traveling unit 200 and the light emitting unit 120 so that the traveling unit 200 is driven forward, and also, the light emitting unit 120 emits light (that is, the light emitting unit 120 is turned on).

Also, when information in which an obstacle does not exist at the front of the modular movable robot 1 is received from the depth sensor 110, the control unit 550 may control each of the traveling unit 200 and the light emitting unit 120 so that the traveling unit 200 is driven forward, and also, turn-off of the light emitting unit 120 is maintained.

The traveling unit 200 may be mounted on a lower end of the main body 100 to allow the main body 100 to be movable.

In detail, the traveling unit 200 may include a plurality of driving wheels 200a, 200b, 200c, and 200d and a plurality of driving motors (not shown) that respectively independently drive the plurality of driving wheels 200a, 200b, 200c, and 200d.

Thus, each of the driving wheels 200a, 200b, 200c, and 200d may be independently driven forward and backward, and thus, the modular movable robot 1 may be easily changed in direction.

For reference, although four driving wheels are provided in the drawings, the present disclosure is not limited thereto. That is, four or more or four or less driving wheels may be provided.

Also, the traveling unit 200 may be controlled by the control unit 550.

In detail, the driving motor of the traveling unit 200 may be controlled by the control unit 550. That is, since the driving motor is driven by the driving motor, the driving wheels 200a, 200b, 200c, and 200d connected to the driving motor may also be driven.

The module coupling plate 300 may be mounted on the upper end of the main body 100, and an object to be transferred may be disposed on a top surface of the module coupling plate 300.

In detail, the module coupling plate 300 may be mounted on the upper end of the main body 100, and the module coupling plate 300 may have, for example, a circular or oval cross-section, like the main body 100.

Also, the body display unit 400 may be disposed on one end of the module coupling plate 300 to extend in a longitudinal direction (i.e., a vertical direction). That is, the body display unit 400 may be integrated with a front end of the module coupling plate 300. Alternatively, the body display unit 400 may be disposed on other portions (e.g., a rear side or a lateral side) in addition to the front side of the module coupling plate 300. Also, the body display unit 400 may be provided in a separation type (i.e., separate components) in addition to the integration type. However, for convenience of description, according to an embodiment, the structure in which the body display unit 400 is integrated with the front end of the module coupling plate 300 will be described as an example.

A porter module PM may be coupled to the top surface of the module coupling plate 300.

Particularly, when the porter module PM is coupled (i.e., is electrically connected) to the top surface of the module coupling plate 300, the module coupling plate 300 may receive module information (for example, identification (ID) of the porter module PM) from the porter module PM.

Also, the module coupling plate 300 may detect that the module coupled to the top surface is the porter module PM based on the module information provided from the porter module PM. Alternatively, the module coupling plate 300 may provide the information with respect to the detected module (i.e., the module information of the porter module PM) to the control unit 550.

Also, although not shown in the drawings, according to an embodiment, the module coupling plate 300 may include a detection sensor (not shown) that is capable of detecting the module coupled to the top surface.

Here, the detection sensor may detect a weight of the module coupled to the top surface of the module coupling plate 300 to determine the kind of corresponding module.

Particularly, the detection sensor may detect a weight of the module coupled to the top surface of the module coupling plate 300 to compare the detected weight of the module to weight information (for example, weight information of each of the porter module, the shopping module, and the serving module) for each module, which is stored in internal database (for example, database provided in the module coupling plate 300 or the main body 100). Thereafter, the detection sensor may select the module having the weight information that matches the detected weight of the module to provide information with respect to the selected module to the control unit 550.

Also, the detection sensor may be linked with the body display unit 400 to detect a height (i.e., a vertical height) of the module coupled to the top surface of the module coupling plate 300, thereby determining a kind of corresponding module.

However, for convenience of description, according to an embodiment, a structure in which the module coupling plate 300 is electrically connected to the module coupled to the top surface without a separate detection sensor to detect the kind of corresponding module will be described as an example.

A first opening OP1 opened in front and both side directions and a second opening OP2 opened in a rear direction may be defined between the module coupling plate 300 and the main body 100.

Thus, the depth sensor 110 mounted on the front area of the area between the main body 100 and the module coupling plate 300 may detect an obstacle through the first opening OP1, and the light emitting unit 120 mounted on the rear area of the area between the main body 100 and the module coupling plate 300 may emit light through the second opening OP2.

The body display unit 400 may be disposed to vertically extend from one end of the module coupling plate 300.

In detail, the body display unit 400 may be integrated with the module coupling plate 300, and the head display unit 500 may be rotatably mounted on an upper end of the body display unit 400. Also, specific information (for example, service information with respect to the porter module PM) may be displayed on the body display unit 400.

Also, a user authentication part 420 may be disposed on the body display unit 400.

In detail, the user authentication part 420 may be a module for confirming identification of a user that wishes a specific service from the modular movable robot 1 and provided in the body display unit 400.

Also, the user authentication part 420 may provide information with respect to the authenticated user to the control unit 550. The control unit 550 may control information displayed on the body display unit 400 on the basis of the information with respect to the authenticated user, which is provided from the user authentication part 420. That is, the control unit 550 may display the customized information on the body display unit 400 on the basis of the information with respect to the authenticated user. Alternatively, the control unit 550 may control the fixing operation of the porter module PM and the driving of the traveling unit 200 on the basis of the information with respect to the authenticated user.

For example, at least one of a barcode, a quick response code (QR code), radio frequency identification (RFID), or Bluetooth may be applied to the user authentication part 420.

For reference, a card insertion port 450 may be defined in a front surface of the body display unit 400, and the user authentication part 420 may perform a user authentication operation through a card inserted into the card insertion port 450.

For example, when the user inserts a room card into the card insertion port 450 while the carrier is placed on the modular movable robot 1 provided in the hotel, the user authentication part 420 may identify (i.e., user authentication) of the user (for example, user's passport information, a room number, the number of nights, etc.) through the card inserted in the card insertion port 450. Thereafter, when the user authentication part 420 provides information on the authenticated user to the control unit 550, the control unit 550 may control the body display unit 400 to display the user's room number, the remaining number of nights, a user name, and the like on the body display unit 400 on the basis of the information about the authenticated user. Furthermore, the control unit 550 may control the porter module PM to fix the carrier of the user based on the information with respect to the authenticated user and control the traveling unit 200 to deliver the carrier of the user to the user's room.

A touch screen 440 may be disposed on the body display unit 400.

Particularly, the touch screen 440 may be a device for receiving an input from the user and display specific information (e.g., service information with respect to the porter module PM).

Also, the touch screen 440 may provide the input received from the user to the control unit 550. The control unit 550 may control at least one of the traveling unit 200, the porter module PM, the body display unit 400, the head display unit 500, or the connection unit 510 that will be described later on the basis of the input received from the touch screen 440.

For example, when the user touches a 'Move to Gate 2' icon displayed on the touch screen 440 in a state where the carrier is placed on the modular movable robot 1 in the airport, the touch screen 440 may provide the input received from the user (i.e., the input with respect to 'Move to Gate 2') to the control unit 550. Also, the control unit 550 may control each of the head display unit 500 and the body display unit 400 so that 'winking expression' is displayed on the head display unit 500, and 'move from the current position to Gate 2' is displayed on the body display unit 400 on the basis of the input received from the touch screen 440. Also, the control unit 550 may control the porter module PM based on the input provided from the touch screen 440 to fix the carrier of the user and controls the traveling unit 200 to deliver the carrier of the user to Gate 2.

The head display unit 500 may be rotatably mounted on an upper end of the body display unit 400.

In detail, the head display unit 500 may be mounted on the upper end of the body display unit 400 through the connection unit 510. The head display unit 500 may have, for example, a circular cross-section.

Here, the connection unit 510 may connect the head display unit 500 to the body display unit 400. In more detail, the connection unit 510 may have one end fixed and coupled to the head display unit 500 and the other end rotatably coupled to the body display unit 400. For reference, the connection unit 510 may have one end coupled to a rear surface of the head display unit 500 to pass through the head display unit 500 and the other end coupled to a top surface of the body display unit 400 to pass through the body display unit 400.

For reference, the connection unit 510 may be a portion of the head display unit 500 or be a separate component.

However, for convenience of description, according to an embodiment, the structure in which the connection unit 510 is the component that is separated from the head display unit 500 will be described as an example.

Also, specific information (e.g., service information related to the porter module PM) or facial expression information (e.g., smiley, winking, and the like) depending on the situation) may be displayed on the head display unit 500.

Particularly, the expression information may be disposed on the head display unit 500, and thus, the head display unit 500 may serve as a face of the modular movable robot 1. For reference, in the modular movable robot 1, the head display unit 500 may serve as the face, the connection unit 510 may serve as a neck, the body display unit 400 may serve as a body, and the traveling unit 200 may serve as a foot.

The porter module PM may be coupled to the module coupling plate 300 to fix the object to be transferred.

Particularly, the porter module PM may be coupled to a top surface of a module coupling plate 300 to cover both side surfaces of a body display unit 400. Also, the porter module PM may be detachably coupled to the top surface of the module coupling plate 300.

Also, the porter module PM may include a module body 710 and a module fixing unit 720.

Particularly, the module may be coupled to the top surface of the module coupling plate 300 to cover both the side surfaces of the body display unit 400. In addition, the top surface, the bottom surface, and the rear surface of the module body 710 may be opened, and an inner space of the module body 710 may be an empty space so as to load the object to be transferred.

That is, as illustrated in FIG. 5, when the module main body 710 is viewed from above, the module main body 710 may have a 'C' shape having an opened rear side. Also, the 'C' shape of the module body 710 may be implemented along an edge of the module coupling plate 300.

For reference, a coupling fixing part 605 extending in the vertical direction may be provided on the rear surface of the body display unit 400.

In addition, the module body 710 is coupled to the top surface of the module coupling plate 300 to cover both the side surfaces of the body display unit 400, and the coupling fixing part 605 contacts the front surface of the module body 710. That is, the coupling fixing part 605 supports the front surface of the module body 710.

Also, due to the support structure (i.e., the coupling fixing part 605), the module body 710 may be fixed to the body display unit 400.

For reference, the top surface of the coupling fixing part 605 may be disposed on the same plane as the top surface of the module body 710.

The module fixing unit 720 may be mounted on an inner surface of the module body 710 to fix the object to be transferred, which is disposed on the module coupling plate 300.

Particularly, the module fixing unit 720 may include first and second module fixing parts 723 and 726 and first and second driving parts 724 and 727.

Here, the first module fixing part 723 may be mounted on one side of the inner surface of the module body 710 to press one side of the object to be transferred, and the second module fixing part 726 may be mounted on the other side (i.e., an opposite side of the first module fixing part 723) of the inner surface of the module body 710 to press the other surface of the object to be transferred. Also, in order to increase in a contact area with the object to be transferred, the first and second module fixing parts 723 and 726 may be implemented, for example, in the form of blocks.

Of course, the first and second module fixing parts 723 and 726 may be implemented, for example, in the form of a robot arm. However, for convenience of description, in an embodiment of the present disclosure, the first and second module fixing parts 723 and 726 will be described with an example of being implemented in the block form illustrated in the drawings.

The first driving part 724 may drive the first module fixing part 723 and may be controlled by the control unit 550, and the second driving part 727 may drive the second module fixing part 726 and may be controlled by the control unit 550.

For reference, for example, a hydraulic cylinder driving method or a motor driving method may be applied to the first and second driving parts 724 and 727. That is, the first and second driving parts 724 and 727 may be provided as a hydraulic cylinder or a motor, respectively.

In addition, although not shown in the drawings, the first module fixing part 723 may be provided with a first pressure detection sensor, which detects a first pressure acting between the first module fixing part 723 and one side of the object to be transferred and provide information with respect to the detected first pressure to the control unit 550. In addition, the second module fixing part 726 may be provided with a second pressure detection sensor, which detects a second pressure acting between the second module fixing part 726 and the other side of the object to be transferred and provide information with respect to the detected second pressure to the control unit 550.

Thus, the control unit 550 may control the first driving part 724 based on the information with respect to the first pressure, and control the second driving part 727 based on the information with respect to the second pressure.

Specifically, the control unit 550 compares each of the first and second pressures to a preset reference pressure (e.g., a pressure that is capable of fixing the object to be transferred without damaging the object to be transferred) to control the first and second driving parts 724 and 727 based on the compared results.

For example, the control unit 550 may drive the first and second driving parts 724 and 727 until the first and second pressures become the preset reference pressures, respectively to allow the first and second module fixing parts 723 and 726 to press the object to be transferred. In addition, the control unit 550 may stop the operation of each of the first and second driving parts 724 and 727 when the first and second pressures become the preset reference pressures, respectively, to prevent an excessive pressure from being applied to the object to be transferred. Accordingly, the object to be transferred may be stably fixed to the porter module PM without any damage.

The control unit 550 may be built in the main body 100 to control the porter module PM, the body display unit 400, the head display unit 500, the traveling unit 200, the light emitting unit 120, and the connection unit 510.

That is, the control unit 550 may control information displayed on each of the body display unit 400 and the head display unit 500, rotation of the head display unit 500 (i.e., rotation of the connection unit 510), the operation of each of the traveling unit 200 and the light emitting unit 120, and the fixing operation of the porter module PM.

In detail, as illustrated in FIG. 7, the control unit may receive information (i.e., the module information of the porter module PM) with respect to the module detected by the module coupling plate 300 to control at least one of the body display unit 400 or the head display unit 500 on the basis of the received module information. That is, the control unit 550 may control the body display unit 400 and the head display unit 500 so that specific information (for example, service-related UI (user interface) provided from the porter module PM) is displayed on the body display unit 400 (i.e., the touch screen 440) and the head display unit 500 to correspond to the received module information.

Also, the control unit 550 may receive information with respect to an obstacle detected by the depth sensor 110 to control at least one of the traveling unit 200 or the light emitting unit 120 on the basis of the received information. That is, the control unit 550 may control a driving direction or driving of the traveling unit 200 according to the detected obstacle and also control driving of the light emitting unit 120.

Also, the control unit 550 may control at least one of the information displayed on the body display unit 400 (i.e., the touch screen 400), the fixing operation of the porter module PM, or the driving of the traveling unit 200 on the basis of the information with respect to the authenticated user, which is received from the user authentication part 420.

Also, the control unit 550 may control at least one of the traveling unit 200, the porter module PM, the body display unit 400, or the head display unit 500 on the basis of the input (i.e., the user input) received from the touch screen 440.

Also, the control unit 550 may control rotation of the head display unit 500 on the basis of the information received from the module coupling plate 300, the depth sensor 110, the user authentication part 420, or the touch screen 440. Alternatively, the control unit 550 may control rotation of the connection unit 510 to indirectly control the rotation of the head display unit 550.

As described above, the modular movable robot 1 according to an embodiment of the present disclosure has the same constituent and characteristic as those of the modular movable robot 1 according to the foregoing embodiment. Thus, hereinafter, a process of loading the object to be transferred into the porter module PM and the service provided by the porter module PM will be described with reference to FIGS. 8 to 11.

FIGS. 8 to 10 are schematic views illustrating a process of loading an object to be transferred on a porter module of FIG. 1. FIG. 11 is a schematic view for explaining services provided by the modular movable robot of FIG. 1.

Referring to FIGS. 8 to 10, first, the user (e.g., a guest) may place the object C to be transferred C (e.g., his/her carrier or luggage) on the top surface of the module coupling plate 300 through the opened portion (i.e., the openings of the top and rear surfaces of the porter module PM) of the porter module PM.

Thereafter, as described above, the user may allow the first and second modules of the porter module PM to fix the object C to be transferred through the user authentication operation through the user authentication unit 420 or the input providing operation through the touch screen 440.

That is, as illustrated in FIG. 10, the object C to be transferred may be loaded in the modular movable robot 1 in a state of being stably fixed by the porter module PM.

As illustrated in FIG. 11, the body display unit 400 (particularly, the touch screen 440) of the modular movable robot 1 used in the hotel may basically display a sentence such as "Please insert the card key to set the destination".

Here, when the user who received the room card KC after the check-in operation inserts the room card KC into the card insertion hole 450 while the object C to be transferred is placed on the top surface of the module coupling plate 300, services such as the above-described user authentication operation, the fixing operation of the object to be transferred, the delivery operation of the object to be transferred may be provided to the user.

As described above, the modular movable robot 1 according to an embodiment of the present disclosure may provide the various services according to the module to be coupled and thus may improve the utilization of the existing robot for the daily life.

In addition, the modular movable robot 1 according to an embodiment of the present disclosure may be automatically driven to expand the application fields and improve the service quality. Also, it may be unnecessary to directly move the robot so as to provide the service at a specific position or place, thereby improving usability.

Hereinafter, a modular movable robot according to another embodiment of the present disclosure will be described with reference to FIGS. 12 and 13.

FIG. 12 is a perspective view for explaining a modular movable robot according to another embodiment of the present disclosure. FIG. 13 is a schematic view for explaining some components of the modular movable robot of FIG. 12.

For reference, a modular movable robot 2 according to another embodiment of the present disclosure is the same as the modular movable robot 1 of FIG. 1 except for some components, and thus, a difference therebetween will be mainly described.

Referring to FIGS. 12 and 13, unlike the modular movable robot 1 of FIG. 1, a modular movable robot 2 according to another embodiment of the present disclosure includes a first coupling fixing part 610 and a second coupling fixing part 620.

In detail, the first coupling fixing part 610 may be disposed on a rear surface of a body display unit 400 to horizontally extend. Also, the second coupling fixing part 620 may protrude upward from an edge of a top surface of a module coupling plate 300.

Also, the second coupling fixing part 620 may be provided in plurality 620a and 620b (alternatively, two second coupling fixing parts may be provided).

Also, as described above, a porter module PM may be coupled to a top surface of a module coupling plate 300 to cover both side surfaces of a body display unit 400.

Thus, when the porter module PM is coupled to the modular movable robot 2, the first coupling fixing part 610 contacts a front surface of the porter module PM, and the second coupling fixing part 620 contacts a bottom surface of the porter module PM. That is, the first coupling fixing part 610 supports the front surface of the porter module PM, and the second coupling fixing part 620 supports the bottom surface of the porter module PM.

Also, due to the support structure (i.e., the first and second coupling fixing parts 610 and 620), the porter module PM may be firmly fixed to the body display unit 400 and the module coupling plate 300. That is, the porter module PM may be fixed to the body display unit 400 by the first coupling fixing part 610 and fixed to the module coupling plate 300 by the second coupling fixing part 620.

For reference, a longitudinal length of the first coupling fixing part 610 may be greater than a longitudinal length of the coupling fixing part 605 of FIG. 1. That is, the top surface of the first coupling fixing part 610 may be disposed on a plane higher than the top surface of the module body 710 in a vertical direction.

Accordingly, the first coupling fixing part 610 may be more stably fixed to the porter module PM than the above-described coupling fixing part 605 of FIG. 1.

Also, although not shown, the above-described detection sensor may be disposed on the second coupling fixing part 620.

While the present disclosure has been described with respect to certain preferred embodiments, it will be apparent to those skilled in the art that various changes and modifications may be made without departing from the scope of the invention as defined in the following claims.

The invention claimed is:

1. A modular movable robot comprising:
a main body;
a traveling unit mounted on a lower portion of the main body to allow the main body to be movable;
a porter module coupled to the main body to fix an object to be transferred, the porter module being configured to provide module information to the main body;
a body display unit extending from the main body in a vertical direction;
a head display unit rotatably mounted on an upper portion of the body display unit; and
a control unit configured to receive the module information from the porter module to control at least one of the body display unit or the head display unit on the basis of the received information,
wherein the porter module comprises:
a module body coupled to a top surface of the main body to cover opposite side surfaces of the body display unit; and
a module fixing unit mounted on an inner surface of the module body to fix the object to be transferred, which is disposed on the main body, and
wherein the module fixing unit comprises:
a first module fixing part mounted on one side of the inner surface of the module body to press one surface of the object to be transferred;
a first driving part configured to drive the first module fixing part, the first driving part being controlled by the control unit;
a second module fixing part mounted on the other side of the inner surface of the module body to press the other surface of the object to be transferred; and
a second driving part configured to drive the second module fixing part, the second driving part being controlled by the control unit.

2. The modular movable robot according to claim 1, wherein a top surface, a bottom surface, and a rear surface of the module body are opened to load the object to be transferred, and
wherein an inner space of the module body is an empty space.

3. The modular movable robot according to claim 1, wherein the module body has a C shape with a rear side opened.

4. The modular movable robot according to claim 1, wherein a first pressure detection sensor configured to detect a first pressure that acts between the first module fixing part and one surface of the object to be transferred and provide information on the detected first pressure to the control unit is provided on the first module fixing part,
wherein a second pressure detection sensor configured to detect a second pressure that acts between the second module fixing part and the other surface of the object to be transferred and provide information on the detected second pressure to the control unit is provided on the second module fixing part, and
wherein the control unit is configured to control the first driving part on the basis of the information on the first pressure and control the second driving part on the basis of the information on the second pressure.

5. The modular movable robot according to claim 1, wherein a hydraulic cylinder driving method or a motor driving method is applied to the first and second driving parts.

6. The modular movable robot according to claim 1, further comprising:
a depth sensor mounted in the main body to detect an obstacle disposed outside the main body; and
a light emitting unit in the main body to emit light.

7. The modular movable robot according to claim 6, wherein a first opening opened in front and both side directions and a second opening opened in a rear direction are defined on the main body.

8. The modular movable robot according to claim 7, wherein the depth sensor detects the obstacle through the first opening, and
wherein the light emitting unit emits the light through the second opening.

9. The modular movable robot according to claim 6, wherein the control unit receives information with respect to the obstacle detected by the depth sensor to control at least one of the traveling unit or the light emitting unit on the basis of the received information.

10. The modular movable robot according to claim 1, wherein the main body comprises a module coupling plate which is mounted on an upper portion of the main body and on which the object to be transferred is disposed on a top surface thereof, and
wherein the module coupling plate is integrally formed with the body display unit.

11. The modular movable robot according to claim 1, wherein a user authentication part is provided in the body display unit,
wherein information with respect to a user, which is authenticated by the user authentication part, is provided from the user authentication part to the control unit, and
wherein the control unit controls at least one of information displayed on the body display unit, the fixing operation of the porter module, or driving of the traveling unit on the basis of the information with respect to the user, which is received from the user authentication part.

12. The modular movable robot according to claim 1, wherein a touch screen configured to receive an input from the user is disposed on the body display unit,
wherein the touch screen provides the input received from the user to the control unit, and
wherein the control unit controls at least one of the traveling unit, the porter module, the body display unit, or the head display unit on the basis of the input received from the touch screen.

13. The modular movable robot according to claim 1, wherein the traveling unit comprises:
a plurality of driving wheels; and
a plurality of driving motors configured to alternatively independently drive the plurality of driving wheels,
wherein the control unit controls the plurality of driving motors.

14. The modular movable robot according to claim 1, further comprising a connection unit configured to connect the head display unit to the body display unit,
wherein the connection unit has one end fixed and coupled to the head display unit, and
wherein the connection unit has the other end fixed and rotatably coupled to the body display unit.

15. A modular movable robot comprising:
a main body;
a traveling unit mounted on a lower portion of the main body to allow the main body to be movable;
a porter module coupled to the main body to fix an object to be transferred, the porter module being configured to provide module information to the main body;
a body display unit extending from the main body in a vertical direction;
a head display unit rotatably mounted on an upper portion of the body display unit; and
a control unit configured to receive the module information from the porter module to control at least one of the body display unit or the head display unit on the basis of the received information,
wherein the porter module comprises:
  a module body coupled to a top surface of the main body to cover opposite side surfaces of the body display unit; and
  a module fixing unit mounted on an inner surface of the module body to fix the object to be transferred, which is disposed on the main body,
wherein a coupling fixing part provided to extend in the vertical direction is disposed at a rear surface of the body display unit,
wherein the module body is fixed to the body display unit by the coupling fixing part, and
wherein a top surface of the coupling fixing part is disposed on the same plane as a top surface of the module body.

16. A modular movable robot comprising:
a main body;
a traveling unit mounted on a lower portion of the main body to allow the main body to be movable;
a porter module coupled to the main body to fix an object to be transferred, the porter module being configured to provide module information to the main body;
a body display unit extending from the main body in a vertical direction;
a head display unit rotatably mounted on an upper portion of the body display unit; and
a control unit configured to receive the module information from the porter module to control at least one of the body display unit or the head display unit on the basis of the received information,
wherein the porter module comprises:
  a module body coupled to a top surface of the main body to cover opposite side surfaces of the body display unit; and
  a module fixing unit mounted on an inner surface of the module body to fix the object to be transferred, which is disposed on the main body,
wherein the main body comprises a module coupling plate which is mounted on an upper portion of the main body and on which the object to be transferred is disposed on a top surface thereof,
wherein the porter module is coupled to the module coupling plate,
wherein a first coupling fixing part extending in the horizontal direction is disposed on a rear surface of the body display unit, and
a second coupling fixing part protruding upward is disposed on an edge of a top surface of the module coupling plate.

17. The modular movable robot according to claim 16, wherein the module body is fixed to the body display unit by the first coupling fixing part and fixed to the module coupling plate by the second coupling fixing part, and
wherein a top surface of the first coupling fixing part is disposed on a plane that is higher than a top surface of the module body.

18. A modular movable robot comprising:
a main body;
a traveling unit mounted on a lower portion of the main body to allow the main body to be movable;
a porter module coupled to the main body to fix an object to be transferred, the porter module being configured to provide module information to the main body;
a body display unit extending from the main body in a vertical direction;
a head display unit rotatably mounted on an upper portion of the body display unit;
a control unit configured to receive the module information from the porter module to control at least one of the body display unit or the head display unit on the basis of the received information; and
a connection unit configured to connect the head display unit to the body display unit,
wherein the connection unit has one end fixed and coupled to the head display unit,
wherein the connection unit has the other end fixed and rotatably coupled to the body display unit,
wherein the one end of the connection unit is coupled to a rear surface of the head display unit to pass through the head display unit, and
wherein the other end of the connection unit is coupled to a top surface of the body display unit to pass through the body display unit.

* * * * *